2,807,589
PRODUCTION OF SURFACE-ACTIVE AGENTS FOR SULFONATION OF PETROLEUM OIL

Edward Mitchell, Rosedale, and Earl L. Humphrey, Verona, Pa., assignors to Gulf Research & Development Company, Pittsburgh, Pa., a corporation of Delaware No Drawing. Application April 10, 1952, Serial No. 281,654

2 Claims. (Cl. 252—353)

This invention relates to the production of surface-active agents and in particular to the production of surface-active agents by the sulfonation of petroleum oil stocks.

It is well known to produce oil-soluble sulfonic acids by sulfonating selected petroleum oil stocks. These petroleum sulfonic acids and their salts have attained great importance because of their many commercial applications as surface active agents. A conventional commercial procedure for preparing such sulfonic acids and sulfonates from petroleum oil requires that the sulfonation be carried out by adding concentrated sulfuric acid to the petroleum oil in a large number of portions or dumps with a lengthy settling period being required after each dump for the removal of sludge. This procedure is complicated and excessively time consuming.

The process of the present invention produces oil-soluble sulfonic acids or sulfonates in good yields and with a short time requirement.

Our process in general comprises, in a first stage, sulfonating a lubricating oil stock with a paste of fuller's earth and oleum, recovering the oil layer of the first stage product and, in a second stage, treating the oil layer with oleum.

The charge stocks to our process are petroleum distillates or solvent extracts of such distillates of the lubricating oil range. They can be paraffinic, naphthenic, or mixed-base lubricating oils. Suitable stocks exist over a wide range of viscosities. Thus, for example, suitable lubricating oils can have viscosities from as low as about 100 SUS to about 1900 SUS at 100° F. One oil which has been sulfonated by our process with excellent results is a 500/3 Texas distillate. The oils of very high viscosity are preferably diluted with a low-viscosity solvent such as hexane.

The sulfonation in accordance with the process of our invention requires first the preparation of a paste of fuller's earth and oleum. This oleum, which is a solution of sulfur trioxide in concentrated sulfuric acid, can for example be a solution which is referred to as 104 percent $H_2SO_4$. The weight ratio of fuller's earth to oleum in the paste can range from about 2:1 to 1:3, respectively, with the preferred ratio being about 1 part by weight of fuller's earth to 2 parts by weight of oleum. In general it is desired to avoid a very slushy mixture.

The weight ratio of paste to oil in the first-stage reaction can range from about 1:2 to 1:6 with a preferred range of ratio of paste to oil of about 1:3 to 1:5 parts by weight. The temperature of the first-stage reaction can be from about 70° to about 200° F. with the preferred temperature for the first stage being in the lower portion of this range. The specific optimum reaction temperatures for different oils will differ somewhat but will be generally within the indicated range. Example I below shows that a first-stage temperature from 80° to 95° F. gave good results for the particular oil being sulfonated. At temperatures above about 200° F. the yield of oil-soluble acids is sometimes reduced as a result of decomposition. An indication of excessive decomposition is the rapid evolution of sulfur dioxide from the oil solutions of sulfonic acids. The time of reaction for the first stage can be from about one to eight hours although one and one-half hours to three hours is generally sufficient. The reaction is exothermic for at least about one hour. It is preferable to agitate the mixture of paste and oil during the reaction.

When the first-stage reaction is complete, the reaction mixture is dispersed in water to separate the fuller's earth and oleum from the sulfonated oil by water washing. In the water-washing step at least about one volume of water per volume of oil is desirable, although the amount of water is not critical.

In the second stage of our process the oil layer from the water-washing step is treated with fuming sulfuric acid or oleum at an elevated temperature, preferably with agitation. In this second stage the ratio of oleum to the pretreated oil should be between about 1:2 and 1:4 parts by weight, respectively. If less than about 1 part of oleum to 4 parts of pretreated oil is employed, the yield of sulfonic acids is reduced. The temperature in the second-stage treatment should be maintained between about 70° and 200° F. and preferably should be in the upper portion of this range. As in the case of the first-stage reaction temperature, the specific optimum temperature will depend upon which particular oil is being sulfonated. Example I below shows that a second-stage temperature of about 160° to 170° F. gave good results with the particular oil used in the example. Above about 200° F. the yield of oil-soluble sulfonic acids is sometimes reduced. The time of agitation for the second-stage reaction can be between about ½ to 5 hours, and usually considerably less than 5 hours is sufficient. Usually 1 to 3 hours settling time is required after agitation is stopped. At the end of the settling period the acid oil is separated from the sludge as by decantation and preferably is then air blown to improve the color and to coagulate pepper sludge which is found dispersed throughout the oil.

The air-blown acid oil is preferably converted to the most suitable form for an emulsifying agent by neutralization with aqueous caustic solution to form sulfonates. As an example, the sodium sulfonates can be prepared by neutralizing the acid oil from the second-stage sulfonation with the theoretical amount of 40 percent sodium hydroxide solution, stirring for about two hours at 140°–160° F., heating to 250°–275° F. to remove water, and filtering after adding 1–2 percent filter aid. However, any neutralization procedure that results in a clear product with no large excess of caustic is suitable.

We have conducted sulfonations of a 500/3 Texas oil, the inspection data of which is listed in Table I below, according to the process of our invention and according to a prior art process. A comparison of the products of these experiments will show the superiority of our process. The sulfonation by our process was carried out as described in Example I below.

Table I

INSPECTION OF 500/3 TEXAS OIL

| | |
|---|---:|
| Specific gravity, 60°/60° F. | 0.9254 |
| Viscosity: | |
| @ 100° F., SUS | 503 |
| @ 130° F., SUS | 198 |
| @ 210° F., SUS | 54.4 |
| Viscosity index | 29 |
| Color | 3 |
| Pour point, ° F. | −20 |
| Flash point (C.O.C.), ° F. | 390 |
| Fire point, ° F. | 435 |
| Carbon residue, wt. percent | 0.03 |
| Acid number | 0.03 |
| Ash (oxide), wt. percent | <0.01 |
| Sulfur, wt. percent | 0.21 |

EXAMPLE I

To 100 parts by weight of the 500/3 Texas oil was added a paste made by mixing 9.4 parts by weight of dry fuller's earth with 18.4 parts by weight of 104 percent sulfuric acid. The reactants were stirred vigorously while maintaining a reaction temperature between about 80° and 95° F. for two hours. After two hours' agitation about 100 parts by weight of water was added to the reaction mixture and the agitation was continued for about 30 minutes until the fuller's earth was free of adsorbed oil. The water-oil mixture was allowed to settle and the water and fuller's earth were separated from the acid oil by decantation. The oil layer was then heated to 160° F. and agitated vigorously while 30 parts by weight of 104 percent sulfuric acid was slowly added over one hour. The reaction temperature during the addition of oleum and for 30 minutes thereafter, was maintained at 160°–170° F. At the end of this time, agitation was stopped and the sludge was permitted to settle for about two hours. The acid oil was then separated from the sludge by decantation and air blown for a period of about 4 hours at 120°–140° F. to remove sulfur dioxide and coagulate the small amount of "pepper" sludge in the oil. About 73.6 parts by weight of air-blown acid oil was recovered and was then neutralized by stirring with about 1.95 parts by weight of 40 percent sodium hydroxide solution for two hours at 140°–160° F., heating to about 275° F. to remove water, and filtering after adding about 2 percent filter aid.

A portion of the same 500/3 Texas oil which was sulfonated by our process as described in Example I was also sulfonated by a prior art commercial process which involved reacting the oil with 6 dumps of oleum as described in Example II below.

EXAMPLE II 100 parts by weight of the 500/3 Texas oil was charged to a sulfonation kettle and 0.93 part by weight of a cutter dump of 98 percent sulfuric acid was added to the oil. The oil and acid were maintained at a temperature of about 95° F. and were agitated for about 10 minutes by bubbling air through the mixture. The mixture was allowed to settle for about 1 hour and a sludge of about .58 part by weight was withdrawn from the bottom of the reactor. The sulfonation of the oil with 6 dumps of oleum, each consisting of about 7.7 parts by weight of 104 percent sulfuric acid, was then begun. When the first dump was added the mixture was agitated by air bubbling for 30 minutes and was then allowed to settle for 4 hours. For each of the second, third, and fourth dumps there was air agitation for one hour, and settling for 4 hours. With the fifth dump there was air agitation for one hour and settling for 24 hours. For the sixth dump the air agitation took place for 1 hour and settling was for 36 hours. The temperature for each dump ranged from about 97° to 112° F. and after each settling period, sludge was withdrawn from the bottom of the reactor. Following the six dumps the sulfonated oil was air blown for about 7 hours at 120° F. About 60.6 parts by weight of air-blown acid oil was recovered and was neutralized by treatment with 0.64% by weight of 40 percent sodium hydroxide solution.

Advantages of our process over the prior art process which are very evident from a comparison of the procedures in Examples I and II are its simplicity and shorter time requirement. Advantages with regard to product are discussed hereinafter.

The sodium sulfonate oils as obtained in the processes described in Examples I and II usually require adjustment of their compositions before they are finished emulsifying agents or soluble oils. The adjustment comprises adding a coupling agent, for example diethylene glycol in an amount of about 1 percent by weight, and then adjusting the pH of the blend of sulfonate oil and coupling agent to between about 7 and 9 by adding caustic or an organic acid.

The optimum pH for any blend is determined by testing the emulsifying properties of a sample and adjusting the pH until the optimum emulsibility is obtained. To obtain the most efficient emulsifying agents it may be necessary that each lot of sodium sulfonate oil be given individual adjustment even though each lot is prepared from the same stock under the same conditions. To determine the suitability of the products prepared in accordance with the process of the invention in Example I and the product obtained by the process of Example II as emulsifying agents for cutting oils, we have adjusted the said products to the best emulsibility characteristics in the above-described manner and have subjected them to emulsion tests.

In the emulsion tests five ml. of the soluble oil blend were added to 95 ml. of distilled water and the mixture was shaken rapidly for one minute. The mixture was then allowed to stand and the appearance of the emulsion was recorded after one hour. The blend (finished soluble oil) was considered as passing the emulsion test if no more than a trace of separation occurred in one hour. The adjusted sodium sulfonate oils prepared by both our process and the prior art process satisfactorily passed and the emulsion test. These tests show that the product of our process is an excellent emulsifying agent for the preparation of water-soluble cutting oils.

Table II below records the yields of the processes of Examples I and II and also the results of the emulsion tests.

*Table II*

|  | Example I | Example II |
|---|---|---|
| Yields: |  |  |
| Acid oil, wt. percent of oil sulfonated | 73.6 | 60.6. |
| Neutralization of acid oil: |  |  |
| 40% caustic solution, wt. percent of acid oil | 2.65 | 0.64. |
| Yield of sodium sulfonate oil, wt. percent of oil sulfonated | 74.1 | 58.3. |
| Inspections: |  |  |
| Acid oil: |  |  |
| Gravity, ° A. P. I. | 22.7 |  |
| Neut. number | 14.57 | 12.0. |
| Sulfur, wt. percent | 0.78 | 0.74. |
| Viscosity, 100° F., SUS | 578 |  |
| Sodium sulfonate oil: |  |  |
| Gravity, ° A. P. I. | 21.5 | 23.4. |
| Neut. number | 0.01 | 0.03. |
| Sulfur, wt. percent | 0.78 | 0.71. |
| Ash (sulfate), percent | 2.38 | 1.67. |
| Color |  | 3. |
| Viscosity, 100° F., SUS | 714 | 511. |
| Emulsification properties: |  |  |
| Best adjusted sample: |  |  |
| Sodium sulfonate oil, wt. percent | 97.93 | 97.67. |
| Diethylene glycol, wt. percent | 0.99 | 0.98. |
| 40% caustic solution, wt. percent | 0.36 | 0.36. |
| Oleic acid, wt. percent | 0.72 | 0.99. |
| Water, added wt. percent |  | 0.39. |
| Appearance of sample | Thin | Thin, yellow. |
| Emulsion Test: |  |  |
| Distilled water test, 1 hr | Pass | Pass. |
| Ml. oil-ml. cream separated | 0-0 | 0-0. |

Table II clearly indicates the improved yields of oil-soluble sulfonic acids obtainable with our process. Thus, as the table shows, the process of the invention yielded 73.6 percent acid oil as compared with only 60.6 percent acid oil for the prior art process, and yielded 74.1 percent of sodium sulfonate oil as compared with only 58.3 percent for the prior art process. When this marked improvement in yield of valuable oil-soluble sulfonic acids is considered together with the greater simplicity of our process and its shorter time requirement, the superiority of our process over the prior art process is very clear.

Another advantage of our process is in the reduction or elimination of troublesome emulsions in the sulfonation of petroleum oils. In prior methods of sulfonation it has often happened that difficultly resolvable emulsions were formed upon water washing or neutralizing the oil layer of the sulfonated oil. The problem has been especially serious with heavy oils such as those of the lubricating oil range. However, our sulfonation process has the advantage that no serious emulsion problems are encountered and a satisfactorily sharp separation is obtained in washing or neutralizing the acid oil layer. We do not wish to be bound by any theory, but in explanation of this advantageous characteristic of our process we can say that, possibly, substances which would cause the oil and water to emulsify are, in our process, absorbed by the fuller's earth particles and are removed with the clay-water slurry in water washing.

The surface active agents obtained by the process of our invention have been described specifically as being excellent emulsifying agents for the preparation of soluble cutting oils. While this is a very important use for the products of our process, it must be understood that they have wider usages. Thus, our process can produce surface active agents which have many other applications, for example in the textile industry where they are useful as machine and fiber lubricants which can be readily removed from goods by washing with water, also in the preparation of extreme pressure agents, oil-soluble dyes, insecticides, dispersing agents, detergents, and the like.

Obviously many modifications and variations of the invention as hereinbefore set forth may be made without departing from the spirit and scope thereof and therefore only such limitations should be imposed as are indicated in the appended claims.

We claim:

1. A process for preparing an emulsifying agent which comprises contacting a petroleum lubricating oil stock with a paste of fuller's earth and oleum at a temperature between about 70° and 200° F. for a period of about one hour to eight hours, said paste having a weight ratio of fuller's earth to oleum of from about 2:1 to 1:3, respectively, the weight ratio of said paste to said lubricating oil stock being from about 1:3 to about 1:5, water washing the first-stage reaction mixture and separating the mixture into an oil layer and a sludge, in a second-stage reaction subjecting the oil layer from the first-stage product to reaction with oleum at a temperature between about 70° and 200° F. for a period of about one-half hour to five hours, the weight ratio of oleum to said oil being between about 1:2 and 1:4, separating the resulting acid oil from sludge and neutralizing the acid oil to obtain sulfonates.

2. A process for preparing an emulsifying agent which comprises contacting a petroleum lubricating oil stock with a paste of fuller's earth and oleum at a temperature between about 70° and 200° F. for a period of about one hour to eight hours, said paste containing about one part by weight of fuller's earth per two parts of oleum, the weight ratio of said paste to said lubricating oil stock being from about 1:3 to about 1:5, water washing the first-stage reaction mixture and separating the mixture into an oil layer and a sludge, in a second-stage reaction subjecting the oil layer from the first-stage product to reaction with oleum at a temperature between about 70° and 200° F. for a period of about one-half hour to five hours, the weight ratio of oleum to said oil being between about 1:2 and 1:4, separating the resulting acid oil from sludge, neutralizing the acid oil with caustic to obtain sulfonates, adding about one percent of a coupling agent to the sulfonate oil, and adjusting the pH to between about 7 to 9.

References Cited in the file of this patent

UNITED STATES PATENTS

| | | |
|---|---|---|
| 1,747,987 | Reddish | Feb. 18, 1930 |
| 1,785,270 | Lavirotte | Dec. 16, 1930 |
| 2,189,128 | Breth | Feb. 6, 1940 |
| 2,388,677 | Cohen | Nov. 13, 1945 |
| 2,416,397 | Lemmon | Feb. 25, 1947 |
| 2,470,913 | Bjorksten | May 24, 1949 |

UNITED STATES PATENT OFFICE

CERTIFICATE OF CORRECTION

Patent No. 2,807,589  September 24, 1957

Edward Mitchell et al.

It is hereby certified that error appears in the above numbered patent requiring correction and that the said Letters Patent should read as corrected below.

In the heading to the printed specification, lines 2 and 3, title of invention, for "PRODUCTION OF SURFACE-ACTIVE AGENTS FOR SULFONATION OF PETROLEUM OIL" read -- PRODUCTION OF SURFACE-ACTIVE AGENTS BY SULFONATION OF PETROLEUM OIL --; in the printed specification, column 4, line 23, after "passed" strike out "and".

Signed and sealed this 5th day of November 1957.

(SEAL)
Attest:

KARL H. AXLINE
Attesting Officer

ROBERT C. WATSON
Commissioner of Patents